US005156005A

United States Patent [19]

Redlich

[11] Patent Number: 5,156,005

[45] Date of Patent: Oct. 20, 1992

[54] CONTROL OF STIRLING COOLER DISPLACEMENT BY PULSE WIDTH MODULATION OF DRIVE MOTOR VOLTAGE

[75] Inventor: Robert W. Redlich, Athens, Ohio

[73] Assignee: Sunpower, Inc., Athens, Ohio

[21] Appl. No.: 705,660

[22] Filed: May 24, 1991

[51] Int. Cl.[5] .......... F25B 9/00; H02P 1/00

[52] U.S. Cl. .......... 62/6; 318/811; 417/45

[58] Field of Search .......... 62/6; 318/811, 129; 417/45

[56] References Cited

U.S. PATENT DOCUMENTS

| | | | |
|---|---|---|---|
| 4,417,448 | 11/1983 | Horn et al. | 62/6 |
| 4,620,143 | 10/1986 | Matty | 318/811 |
| 4,628,475 | 12/1986 | Azusawa et al. | 318/811 X |

*Primary Examiner*—William E. Wayner

*Attorney, Agent, or Firm*—Frank H. Foster

[57] ABSTRACT

The displacement of a Stirling cycle cryocooler is controlled as a function of temperature by controlling the amplitude of the fundamental component of an AC signal which is applied to the motor at its operating frequency. A pulse train is generated, having a frequency which is a harmonic of the operating frequency. The duty cycle of the pulse train is modulated between 50% and 100% as a function of the temperature. The modulated pulse train is applied to the motor during one-half of the load's operating period and the complement of the pulse train is applied to the load during the other half of its operating period. Modulating the duty cycle of the pulse train (and consequently simultaneously of its complement) as a function of temperature variably controls the amplitude of the fundamental component of the drive voltage and therefore variably controls the displacement of the motor and, as a consequence, of the cryocooler piston.

12 Claims, 4 Drawing Sheets

CONTROL OF STIRLING COOLER DISPLACEMENT BY PULSE WIDTH MODULATION OF DRIVE MOTOR VOLTAGE

TECHNICAL FIELD

This invention relates generally to a Stirling cycle refrigeration heat pump, and more particularly relates to a controlled drive circuit for controlling the displacement of the free piston in the Stirling cycle cooler as a function of temperature by pulse width modulating a pulse train with a pulse repetition frequency that is a harmonic of the operating frequency and a modulating frequency equal to the operating frequency to control the amplitude of the fundamental of the drive voltage driving the linear motor which is the prime mover driving the free piston.

BACKGROUND ART

Free piston Stirling cryocoolers and other free piston Stirling heat pumps are typically powered by a linear, electric drive motor which drives the free piston in reciprocation. The rate at which heat is pumped by the Stirling cooler is an increasing, continuous function of the displacement at which its piston is driven. Consequently, it is desirable to control the piston displacement by controlling the drive voltage applied to the motor which drives the piston. It is desirable to control the piston displacement as a function of the temperature of the refrigerated compartment in order to stabilize the temperature within the design limits and to avoid piston-displacer collision resulting from reduced loading before the nominal design temperature is reached, especially initially when the refrigerated compartment temperature is near the ambient temperature.

More specifically, when the cold end temperature is above the selected design value, it is desirable that the piston displacement be increased in order to increase the thermal energy pumping rate. When the cold end temperature is below the design value, it is desirable to reduce the drive voltage applied to a linear motor in order to reduce displacement and thereby reduce the thermal pumping rate.

It is therefore an object of the present invention to provide a controlled drive circuit for driving the linear motor with a controllable AC voltage at the fundamental frequency equal to the operating frequency which ordinarily is the resonant frequency of the motor and its load. The drive voltage can be a function of cold end temperature and, if desired, other control variables, such as pressure and time, in order to control the stroke or displacement of the piston, both during cool-down from ambient temperature, during which time the dynamics of the sealed, free piston, Stirling cryocooler change because of changing pressure and temperature of the working gas and also in order to stabilize the cold end temperature after operating temperature has been reached.

U.S. Pat. No. 3,220,201 discloses a control circuit in which the width of a rectangular pulse, at the fundamental operating frequency of the drive motor, is controlled in order to maintain a constant fundamental piston amplitude under all conditions. The drive system of this patent not only does not control the free piston displacement as a function of temperature, but, more importantly, it results in an intermediate off time between the drive pulses.

The significant difficulty which that causes arises from the fact that the drive motor must be driven by a power switching circuit consisting of power switching transistors, connected in a switching configuration, such as a conventional H-bridge. The switching technique described in that patent requires an intermediate interval between the pulses when all the switching transistors are turned off. Because the drive voltage is driving a load which includes a significant inductive reactance, the current cannot be instantaneously switched off. Consequently, an attempt to switch all the power switching transistors to an off state causes the instantaneous voltage amplitude applied to the motor to become poorly controlled and distorted. This consequently produces non-sinusoidal motor current.

It is an object of the present invention to control the voltage applied to the motor in a manner so that no instant of time occurs during which all power switching transistors are turned off. It is a purpose and feature of the present invention to provide a circuit in which a current path always exists through the power switching circuit and the motor and a drive voltage is always applied to the motor.

Other cryogenic cooler control systems are shown in U.S. Pat. Nos. 3,991,586 and 4,417,448.

It is therefore a further object and feature of the present invention to provide a circuit which is capable of applying a continuously variable drive voltage to the piston drive motor at the operating frequency, the drive voltage being a substantially linear function of a control variable, such as cryocooler temperature, so that the drive motor displacement can be continuously varied over the range of the control variable.

BRIEF DISCLOSURE OF INVENTION

The invention is a method and apparatus for controlling, as a function of a control input signal, the amplitude of the fundamental component of an AC signal which is applied to a possibly reactive load having an operating frequency, such as a drive motor. A pulse train is generated, having a frequency which is a harmonic of the operating frequency. The duty cycle of the pulse train is modulated so that it is a function of the control input. The modulated pulse train is applied to the load during one-half of the load's operating period. The complement of the pulse train (i.e., the inverse) is applied to the load during the other half of its operating period. Modulating the duty cycle of the pulse train (and consequently simultaneously of its complement) as a function of the control input signal, such as a temperature indicating signal, variably controls the amplitude of the fundamental component of the drive voltage and therefore variably controls the displacement of the motor and, as a consequence, of the piston, which it drives.

Figure 1:
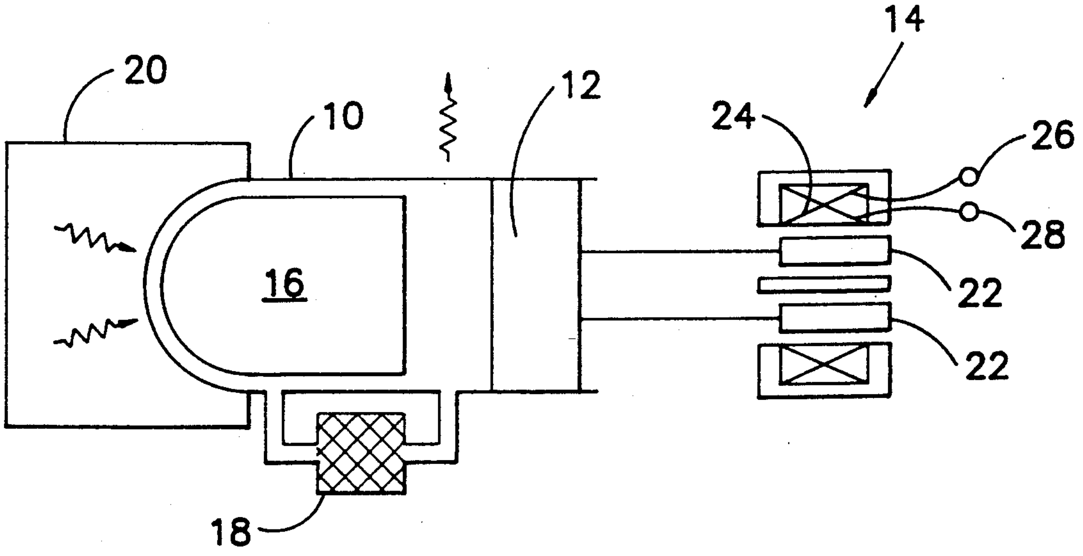
FIG. 1 is a schematic diagram illustrating a free piston cryocooler driven by a linear motor.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art.

DETAILED DESCRIPTION

FIG. 1 illustrates a free piston Stirling cooler 10 having a free piston 12 which is driven by a linear, permanent magnet motor 14. The Stirling cooler also has a conventional displacer 16 and a regenerator 18. The cold end of the Stirling cooler is connected to an insulated, cooled compartment 20 from which heat is pumped as a result of reciprocation of the piston 12 in the conventional manner. The linear motor comprises one or more permanent magnets 22, mechanically linked to the piston 12 and reciprocating within the time-varying magnetic field, induced by current flowing in the armature winding 24. The linear motor 14 is driven by a drive voltage applied to armature terminals 26 and 28. The stroke of the motor 14 is proportional to the amplitude of the applied AC voltage fundamental component.

The system is ordinarily designed to be mechanically resonant at a selected operating frequency, such as, for example, 60 Hz. The drive motor 14 is driven by a drive voltage at this operating frequency.

Figure 2:
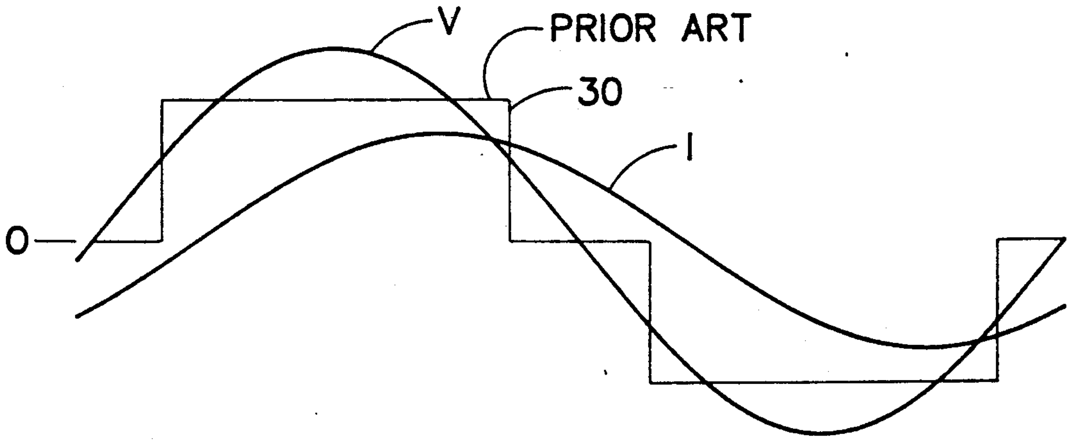
FIGS. 2 and 3 are oscillograms illustrating motor drive signals of the present invention and the prior art.

FIG. 2 illustrates a preferred fundamental component V of the drive voltage applied to the terminals 26 and 28 of the drive motor 14. This will result in a motor drive current I, lagging or leading the drive voltage by a phase angle which is dependent upon the cooler tuning as reflected as the impedance seen at terminals 26 and 28. Also illustrated in FIG. 2 is a drive voltage 30 of the type utilized in the prior art, described above, which is an attempt to approximate the ideal fundamental drive voltage V in order to obtain an ideal motor current I.

Figure 3:
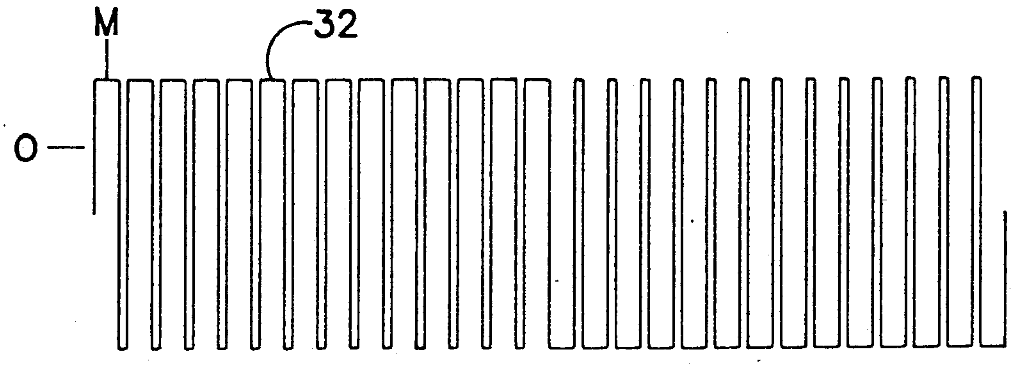

FIG. 3 illustrates a resulting drive voltage signal 32, applied to the drive motor terminals 26 and 28 in accordance with the present invention.

Figure 4:
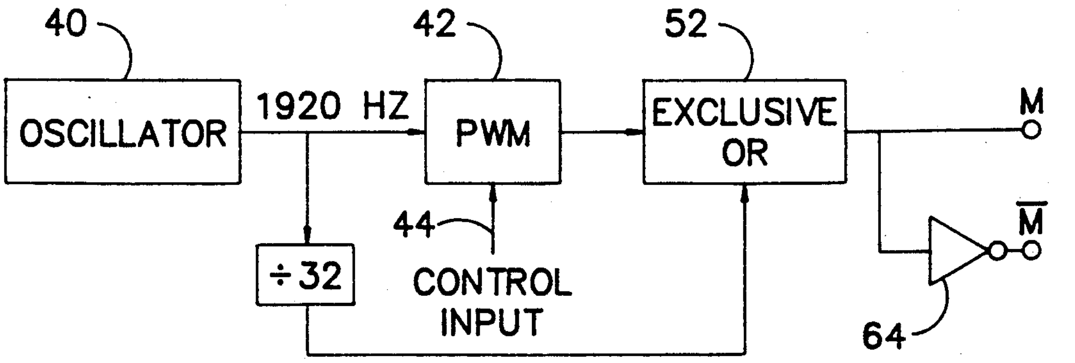
FIGS. 4, 5, and 6 are block diagrams illustrating the circuitry of the present invention.

FIG. 4 illustrates the most simplified block diagram of the preferred embodiment of the invention. An oscillator 40 generates a pulse train, illustrated in FIG. 7, having a pulse repetition frequency which is a harmonic of the operating frequency of the cryocooler system of FIG. 1. For example, in the preferred embodiment having an operating frequency of 60 Hz., the preferred pulse repetition frequency is 1920 Hz. It is preferred that the pulse repetition frequency be equal to a power of 2 times the operating frequency so that frequency dividing circuits can be used to generate the operating frequency from the pulse repetition frequency.

The pulse train output of the oscillator 40 is applied to a pulse width modulating circuit 42, having a control input 44. Preferably, the pulse width modulating circuit 42 provides an output pulse train which has a duty cycle modulated between 50% and 100% as the control input signal at the control input 44 varies between zero and its maximum value. For example, the signal at the control input 44 may be a voltage of zero at a cryocooler temperature below the selected design steady state temperature for the cooling compartment 20 of FIG. 1, at which voltage level, the duty cycle of the output pulses from the pulse width modulator 42 would be 50%. The voltage at the control input 44 would be at a maximum control signal voltage at a selected temperature above the design cooling temperature and for any higher temperature and at or above this maximum control signal voltage would provide a pulse train output from the pulse width modulator, having a duty cycle of 100%.

Figure 5:
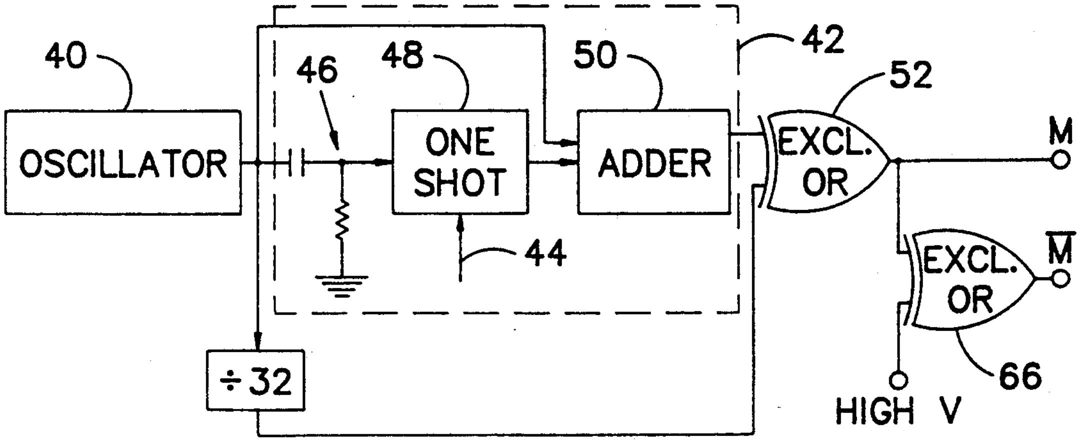

FIG. 5 illustrates a preferred manner of constructing the pulse width modulator 42. It illustrates that the pulse train from the oscillator 40 is applied through a conventional high pass filter 46 to a one shot 48. The one shot 48 is triggered by the trailing edge of each pulse in the pulse train from the oscillator 40 illustrated in FIG. 7. The duration of the pulses from the one shot output is controlled by the voltage at the control input 44.

Figure 7:
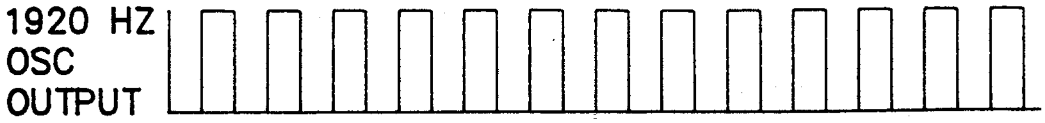
FIGS. 7–11 are oscillograms illustrating the operation of the preferred embodiment of the invention.
Figure 8:
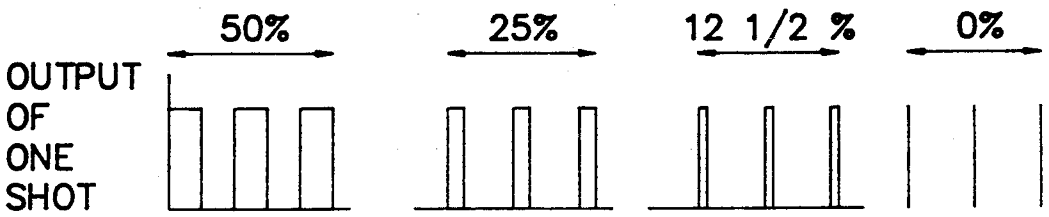

FIG. 8 illustrates four representative outputs from the one shot 44, the pulses of which are triggered by the trailing edges of the pulse train of FIG. 7. They are illustrated in sequence, representing duty cycles which are a function of the voltage at the control input 44. The one shot output pulses range from between 0% to 50% of the period of the pulse train of FIG. 7 from the oscillator 40. For example, pulse widths are shown in FIG. 8 which are respectively 50% of that period, 25% of that period, 12½% of that period, and 0% of that period.

Figure 9:
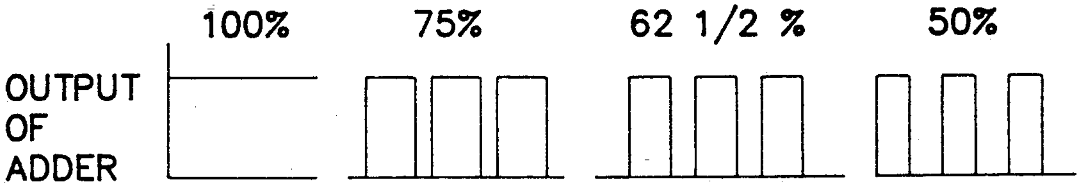

The output pulses from the one shot 48 are then added to the pulse train pulses from the oscillator 40 in an adder circuit 50 to effectively extend the duration of the pulse train pulses. The sum of these pulses, the extended duration pulses, is illustrated in FIG. 9. Consequently, the pulse width of the pulses at the output of the adder 50, that is at the output of the pulse width modulator 42 of FIG. 4 range between a duty cycle of 100% and a duty cycle of 50% as illustrated in FIG. 9.

The output from the pulse width modulator 42 is applied to an exclusive OR gate 52, along with a pulse train at the fundamental operating frequency of the drive motor 14. This signal at the fundamental frequency is derived by applying the 1920 Hz. output signal to a frequency divider which divides by 32 to provide the 60 Hz. input to the exclusive OR gate 52. This exclusive OR operation provides an output signal M which is identical to the output of the pulse width modulator 42 during each first half cycle of the 60 Hz. fundamental operating period and inverts the output from the pulse width modulator 42 to provide its complement during every second half cycle of the 60 Hz. fundamental operating period. This signal M is illustrated in FIG. 3 for a duty cycle of approximately 75%.

The signal M, at the output of exclusive OR gate 52, is in the form of the signal to be applied to the drive motor 14. However, as is known to those skilled in the art, it is necessary that this signal be utilized to drive a power switching circuit which can operate under the high currents at which the motor operates. Consequently, the signal M must be applied to a power switching circuit.

Figure 6:
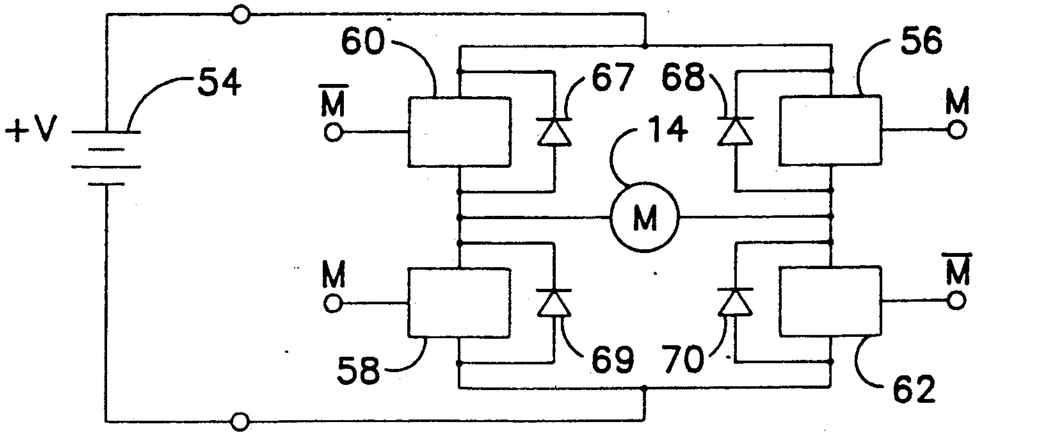

For some switching circuits the signal M alone could be used. However, FIG. 6 illustrates a conventional H-bridge utilized to drive the motor by a power supply voltage 54. The conventional H-bridge requires not only a drive signal M for driving opposite complementary transistors, but additionally requires the complement of the signal M, conventionally designated $\overline{M}$, for the second pair of power switching transistors.

Figure 10:
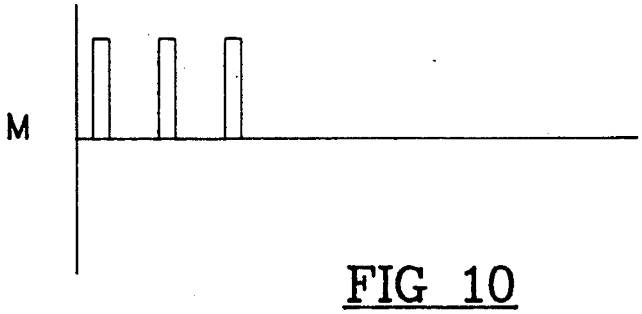
Figure 11:
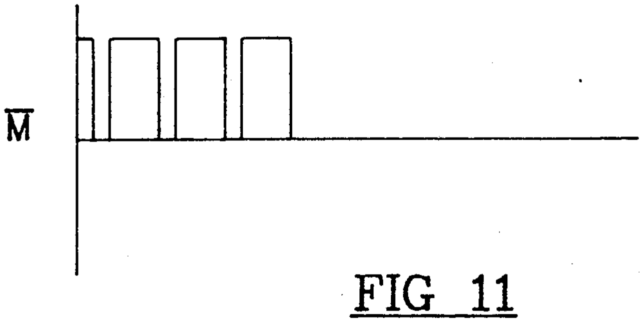

FIGS. 10 and 11 illustrate the two complementary signals M and $\overline{M}$ during a portion of the first half cycle at the fundamental operating frequency. Consequently, the switching control signal M is supplied to transistors 56 and 58 in two legs of the H-bridge and the switching control signal $\overline{M}$ is applied to power switching transistors 60 and 62 in the other two legs in the conventional manner. The signal $\overline{M}$ can be obtained by simply applying the signal M from the output of the exclusive OR gate 52 to an inverter 64. Alternatively, however, in the preferred embodiment it is obtained by applying the output of exclusive OR gate 52 to a second exclusive OR gate 66, as illustrated in FIG. 5.

Consequently, in operation, the voltage applied to the terminals 26 and 28 of the motor 14 illustrated in FIG. 1, is in the form of signal M illustrated in FIG. 3. As can be seen in FIG. 3, there is no time period during which there is not a continuous circuit from the power source 54 to the motor 14, through two power switching transistors or two "free wheeling" diodes (see FIG. 6) which are turned on. More specifically, when switching transistors 56 and 58 are turned off, switching transistors 62 and 60 or "free wheeling" diodes 67 and 70 are turned on and similarly, when transistors 60 and 62 are turned off, transistors 56 and 58 or free wheeling diodes 68 and 69 are turned on. As a result, excessive voltages across the transistors which are turned off are avoided and motor current is flowing only through transistors which are turned completely on or through forward conducting diodes, thus minimizing power dissipation in the transistors themselves. As a result of applying a voltage signal in the form of the signal M illustrated in FIG. 3 to the motor 14, the fundamental component of the voltage applied to the terminals 26 and 28 of the motor 14 is in the form of the voltage V illustrated in FIG. 2.

Variations in the duty cycle of signal M, for example as illustrated in FIG. 9, will cause the amplitude of the fundamental component V to vary in direct linear proportion to the control signal voltage at control input 44. Because the displacement of the piston 12 in the free piston cooler is an increasing, continuous function of the amplitude of the drive voltage V, the displacement of the piston 12 will be an increasing, continuous function of the control signal 44. As a consequence, the power applied to the cooler piston and the thermal pumping rate are a continuous increasing function of that control signal.

Principles of feedback control systems can thus be applied to the present invention. In accordance with conventional feedback control principles, a temperature signal from a sensor in the refrigerated compartment 20 is subtracted from a reference signal to provide an error signal. This error signal is multiplied by applying it to an amplifier having a suitably high gain transfer function and its output is applied to the input 44 of the preferred embodiment of the invention.

At temperatures above a selected temperature range the signal M will have a duty cycle of 100% to maximize the thermal pumping rate and at temperatures below the selected temperature range, the signal M will have a 50% duty cycle, so that the fundamental AC component will become zero and therefore no thermal pumping occurs and the displacement of the piston becomes zero. At intervals within the selected temperature range the duty cycle ranges between 50% and 100%, as determined in accordance with the particular control algorithm designed in accordance with conventional feedback control principles.

Typically the design range will be ±2° C., above and below the design temperature. Between these temperatures the duty cycle will vary continuously from 50% to 100%.

Circuitry embodying the present invention can be utilized by eliminating the adder 50 from FIG. 5 so that the output of the one shot 48 would become the output of the pulse width modulator 42. Such an output would vary between a duty cycle of 0% and 50%, rather than between 50% and 100%, as in the preferred embodiment. A signal like that illustrated in FIG. 3 would be generated, except that the output of the pulse width modulator 42 would have a duty cycle of less than 50% and the complementary output from the exclusive OR gate 52 would be greater than 50%.

In the preferred embodiment an error signal of 0 at the control input 44 produces a 50% duty cycle, which in turn produces zero fundamental drive voltage and consequently zero piston displacement. Similarly, a significant error signal produces a maximum 100% duty cycle, which produces a maximum drive voltage on the motor and therefore maximum piston displacement.

However, if the adder is eliminated, the control function would be inverted, so that a 50% duty cycle would be accomplished with a finite value of error signal and a 100% duty cycle representing maximum drive voltage would be produced by a 0 error control input signal. While the inversion is not preferred, it is possible.

Figure 12:
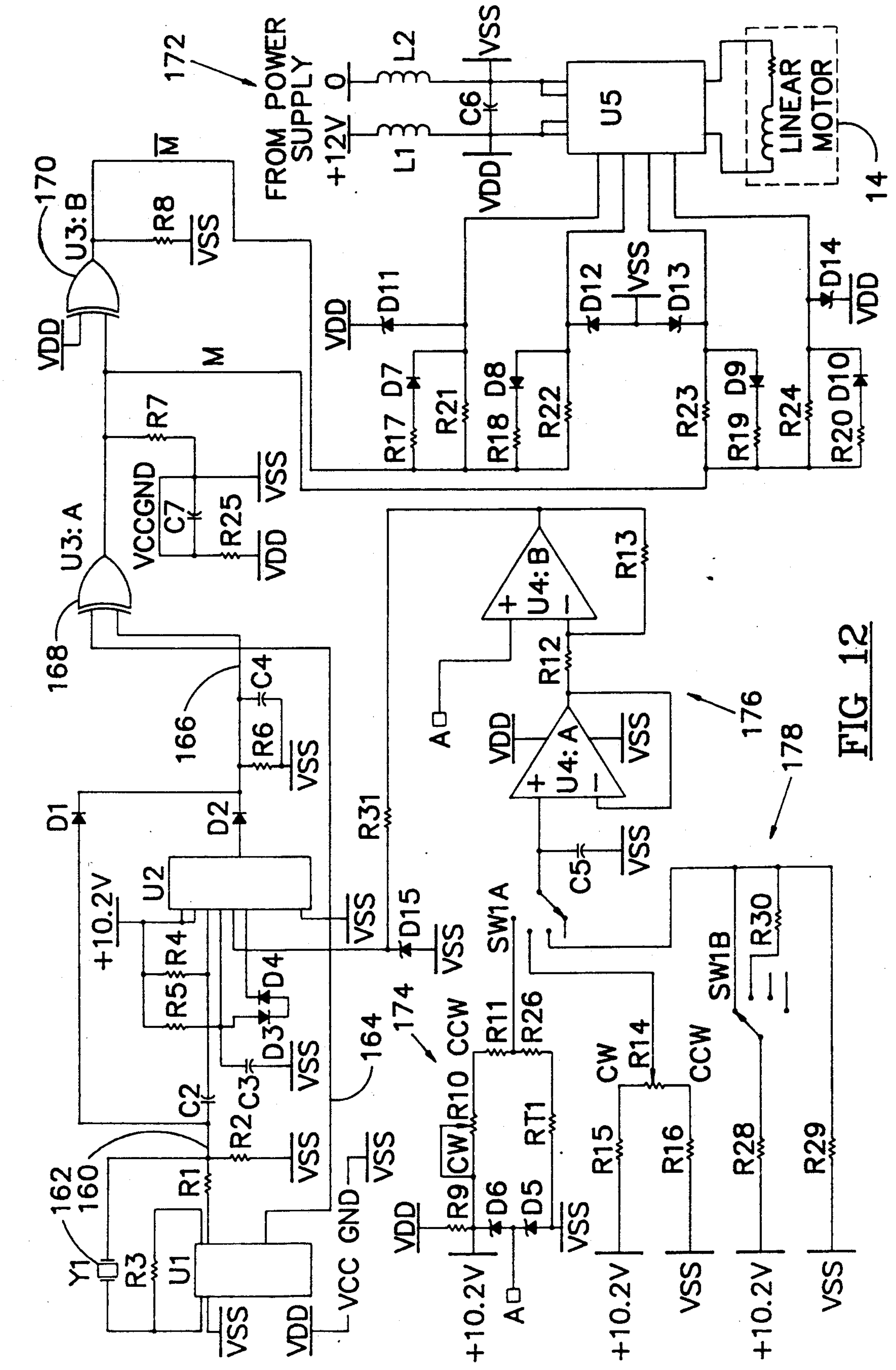
FIG. 12 is a schematic diagram of the preferred embodiment of the invention.

FIG. 12 illustrates a detailed schematic diagram of the preferred embodiment of the invention. Integrated circuit U1 provides an oscillator output at conductor 160, the frequency of which is determined by crystal 162. The IC U1 also includes a frequency divider to provide the 60 Hz. signal at conductor 164. Integrated circuit U2 includes a one-shot, the output of which at terminal 3 is applied across resistor R6 through diode D2, along with the oscillator output through diode D1 for addition. The sum signal on conductor 166, along with the 60 Hz. signal on conductor 164, is applied to the exclusive OR gate 168 and from it to the exclusive OR gate 170.

The two signals M and $\overline{M}$ are applied from the exclusive OR gates 168 and 170 respectively to a conventional H-bridge power switching circuit 172 to drive the linear motor 14. The temperature detecting circuit 174 includes a thermistor RT1 from which a temperature indicating signal is derived and applied through amplifier circuitry 176 to the control input of the one shot 48 in the integrated circuit U2. Single pole, quadruple throw switch SW1A permits the alternative selection of a thermal signal at its connection C4 or alternative preset voltage signals from circuit 178 representing other selected temperatures. The circuit of resistors R14, R15, and R16 are for manual control of duty cycle by means of potentiometer R14. The circuit of resistors R28, R29, R30 and switch SW1B are for selection of fixed duty cycles of 50% and 100% by means of switch SW1B. The circuit component values for the circuit of FIG. 12 are shown in the following table:

FIG. 12 CIRCUIT COMPONENT VALUES

| Component | Value |
|---|---|
| C2 | 1000 pF |
| C3 | .047 uF |
| C4 | 330 pF |

-continued

FIG. 12 CIRCUIT COMPONENT VALUES

| Component | Value |
|---|---|
| C5 | .01 uF |
| C6 | 3300 uF 25 v |
| C7 | 100 uF |
| D1, D2, D3, D4 | 1N4148 |
| D5, D6 | 1N4733 |
| D7, D8, D9, D10 | 1N4148 |
| D11, D12, D13, D14 | 1N4744 |
| D15 | 1N4738 |
| L1, L2 | 8.8 uH 10A |
| R1 | 820K |
| R2 | 220K |
| R3 | 2.2M |
| R4 | 22K |
| R5 | 4700 |
| R6 | 22K |
| R7, R8 | 15K |
| R9 | 33 |
| R10 | 5K |
| R11 | 2K |
| R12 | 10K |
| R13 | 100K |
| R14 | 10K |
| R15, R16 | 43.2K |
| R17, R18, R19, R20 | 620 |
| R21, R22, R23, R24 | 1200 |
| R25 | 100 |
| R26 | 820 |
| R28, R29 | 43.2K |
| R30 | 2200 |
| R31 | 470 |
| RT1 | 3K @ −50 DEG. C. −6%/DEG. C. @ 50 DEG. C. |
| U1 | CD4060BE |
| U2 | LM555CNB |
| U3:A, U3:B | CD407DBE |
| U4:A, U4:B | TL082CPN |
| U5 | CPY203E |
| Y1 | 30.72 KHz |

While certain preferred embodiments of the present invention have been disclosed in detail, it is to be understood that various modifications may be adopted without departing from the spirit of the invention or scope of the following claims.

I claim:

1. A method for controlling, as a function of a control input signal, the amplitude of the fundamental component of an AC signal applied to a reactive load having an operating frequency, said method comprising:

(a) generating a pulse train having a pulse repetition frequency which is a harmonic of said operating frequency;

(b) modulating the duty cycle of said pulse train as a function of said control input;

(c) applying said modulated pulse train to said load during one-half of its operating period; and (d) applying the complement of said pulse train to said load during the other half of its operating period.

2. A method for controlling the amplitude of the motor drive voltage applied to a reciprocating electrical motor driving a load at a selected operating frequency and period, the method comprising:

(a) applying a pulse train voltage to the motor during one-half of its operating period, the pulse train having a pulse repetition frequency which is a harmonic of the motor's operating frequency;

(b) applying the complement of said pulse train voltage to the motor during the other half of its operating period; and (c) modulating the duty cycle of the first pulse train voltage and therefore its complement to control the amplitude of the Fourier component of motor drive voltage at the operating frequency.

3. A method in accordance with claim 2 wherein the pulse train duty cycle is modulated between limits both of which are at least 50%.

4. A method for controlling the amplitude of the motor drive voltage applied to a reciprocating electrical motor driving a load at a selected operating frequency, the method comprising:

(a) generating a pulse train at a harmonic of the selected operating frequency;

(b) generating a square wave at the operating frequency;

(c) generating a series of pulses in synchronism with said pulse train, said series of pulses having a controllably variable modulated width;

(d) generating the complement of the series of modulated pulses;

(e) applying the series of modulated pulses to the motor during one-half of the motor's operating cycle and applying the complement of the series of modulated pulses to the motor during the other half cycle; and (f) controllably varying said modulated width to control the voltage applied to the motor at the operating frequency.

5. A method in accordance with claim 4 wherein said pulse train is generated at a frequency which is a power of two times the operating frequency and the square wave is generated by frequency dividing the pulse train signal.

6. A method in accordance with claim 2 or claim 5 wherein said series of pulses are modulated to have a duty cycle which is variable between substantially 50% of the pulse train period and 100% of the pulse train period in response to a control input signal which varies between a zero level for said 50% duty cycle and a max level for said 100% duty cycle.

7. A method in accordance with claim 6 wherein said series of pulses is generated by summing said pulse train and a series of pulses triggered by the lagging edges of said pulse train and modulated between a 0% and a 50% duty cycle.

8. A method in accordance with claim 7 wherein said load is the piston of a free piston Stirling cooler and wherein the method further comprises sensing the temperature of a portion of the cooler and varying said duty cycle to increase the motor voltage when the temperature is above a selected reference temperature and to decrease the motor voltage when it is below the reference temperature.

9. A circuit for controlling the amplitude of the motor drive applied to a reciprocating electrical motor driving a load at a selected operating frequency, the control circuit comprising:

(a) oscillator circuit means for generating a pulse train at a frequency which is harmonic of said operating frequency;

(b) circuit means for generating a square wave at said operating frequency;

(c) a pulse generating circuit means for generating modulated width pulses having its input connected to the output of said oscillator circuit means and having a control signal input for controlling the pulse width of the pulses at the output of the pulse generating circuit means;

(d) an exclusive OR circuit means having one input connected to the output of the square wave generating circuit means and the other input connected to receive the pulse width modulated pulses for inverting modulated width pulses to provide a complementary output during half of each operating frequency cycle; and (e) a power switching circuit means having its input connected to the output of the exclusive OR circuit means and its output connected to said motor for switching the voltage applied to the motor in response to said modulated width pulses.

10. A circuit in accordance with claim 9 wherein said oscillator circuit means generates a square wave pulse train at a frequency which is the product of said operating frequency multiplied by a power of 2 and wherein a frequency divider is connected to the oscillator output to generate the operating frequency square wave.

11. A circuit in accordance with claim 10 wherein said pulse generating circuit means comprises:

(a) a one-shot circuit triggered by the lagging edge of an oscillator circuit pulse and having a pulse width which is controlled by a signal at a one-shot input terminal; and (b) an adder circuit means having one input connected to the oscillator circuit means and another input connected to the output of the one-shot.

12. A circuit in accordance with claim 11 wherein the power switching means comprises:

(a) an inverter having its input connected to the output of the exclusive OR circuit means; and (b) an H bridge having the output of said exclusive OR circuit means connected to the switching devices of the H bridge which are in one conduction path and having the output of said inverter connected to the switching devices of the other conduction path.

* * * * *